United States Patent [19]
Velho et al.

[11] Patent Number: 5,602,943
[45] Date of Patent: Feb. 11, 1997

[54] DIGITAL HALFTONING SPACE FILLING CURVES

[76] Inventors: Luiz C. Velho; Jonas M. Gomes, both of Instituto de Matematica, Puro e Aplicada, Estradea Dona Castorina 110 22, 460, Rio de Janiero, R. J., Brazil

[21] Appl. No.: 335,549

[22] Filed: Nov. 7, 1994

Related U.S. Application Data

[63] Continuation-in-part of Ser. No. 875,272, Apr. 28, 1992, abandoned.

[51] Int. Cl.$^6$ .................. H04N 1/40; H04N 1/41
[52] U.S. Cl. .................. 382/266; 382/316; 358/455; 358/456; 358/429; 358/298; 358/536
[58] Field of Search .................. 358/448, 455, 358/456, 457, 458, 459, 534, 536, 298, 429; 395/102, 109; 382/266, 267, 269, 316

[56] References Cited

U.S. PATENT DOCUMENTS

| | | | |
|---|---|---|---|
| 4,456,924 | 6/1984 | Rosenfeld | 358/536 |
| 4,499,489 | 2/1985 | Gall et al. | 358/536 |
| 4,651,228 | 3/1987 | Koch | 358/298 |
| 4,780,711 | 10/1988 | Doumas | 345/137 |
| 4,843,468 | 7/1989 | Drewery | 348/207 |
| 4,868,587 | 9/1989 | Loce et al. | 358/298 |
| 4,884,080 | 11/1989 | Hirahara et al. | 358/456 |
| 5,041,920 | 8/1991 | Hayes et al. | 358/456 |
| 5,050,000 | 9/1991 | Ng | 358/298 |
| 5,099,259 | 3/1992 | Hirahara et al. | 358/298 |
| 5,107,349 | 4/1992 | Ng et al. | 358/457 |
| 5,130,821 | 7/1992 | Ng | 358/457 |
| 5,226,096 | 7/1993 | Fan | 358/459 |
| 5,276,535 | 1/1994 | Levien | 358/456 |
| 5,321,525 | 6/1994 | Hains | 358/456 |
| 5,543,935 | 11/1994 | Harrington | 358/429 |

*Primary Examiner*—Edward L. Coles, Sr.
*Assistant Examiner*—Kimberly A. Williams
*Attorney, Agent, or Firm*—Robert M. Downey, P.A.

[57] ABSTRACT

A digital halftoning method for creating a gray-scale monochrome reproduction of a source image includes subdividing the source image into regions based on a trace of the space filing curve, further subdividing each of the regions into equally sized pixels, scanning the source image along the trace of the space filling curve to visit all pixels of the source image, calculating an average image intensity for each region, establishing a range of pixel cluster intensity levels based on a number of pixels in a cluster, and generating a dot pattern for each of the pixel clusters by activating individual ones of the pixels to an ON state in accordance with a sequential order along the trace of the space filling curve.

6 Claims, 9 Drawing Sheets

DIGITAL HALFTONING SPACE FILLING CURVES

BACKGROUND OF THE INVENTION

This application is a Continuation-in-Part application of patent application Ser. No. 07/875,272 filed on Apr. 28, 1992, now abandoned.

1. Field of the Invention

The present invention relates to digital halftoning methods, and more specifically to a digital halftoning method for creating a gray-scale monochrome reproduction of a source image in electronic display and printing systems.

2. Description of the Related Art

The display of gray scale images on bilevel graphic devices requires a reprocessing step in order to adapt the data to the characteristics of the equipment. In particular, a process called "halftoning" creates the illusion of continuous tone through the careful arrangement of the state of individual display cells, being either in the ON state or OFF state. This process can be either analog or digital, depending upon the underlying technology of the imaging system. The analog form of halftoning is well understood, and has been used in the printing industry for more than one century. "Digital halftoning", also known as "spatial dithering", is associated with the display and reproduction of pictures using computer controlled equipment.

The initial motivation for the development of dithering techniques was the popularity of low resolution graphic display devices, such as plasma panels, liquid crystal and CRT monitors. More recently, the availability of high resolution hardcopy devices such as laser printers and digital phototype setters created a new motivation for the development of digital halftoning techniques. These techniques address the needs of the printing industry in the electronic age.

The majority of existing dithering methods were designed for a class of graphic display devices that have a relatively low spatial resolution and allow precise control of individual picture elements (pixels). These methods perform poorly on some hardcopy devices that do not have these properties and can not properly reproduce isolated dots. An important class of devices of this type are the ones based on electrophotographic technology.

The method of the present invention addresses the above discussed problem. The proposed solution is provided in the method of the present invention which is flexible enough to be used in a wide range of graphic devices, as well as in most image reproduction processes.

Spatial dithering techniques can be classified according to the nature of patterns, they generate and to the type of pixel configuration produced. These two criteria capture the main features of the textures created to represent areas of uniform gray, one of the most important aspects of the halftoning process.

The type of pixel configuration produced is determined by the spatial distribution of the ON or OFF state of the picture elements. The ON state picture elements are defined by a black dot, while the OFF state picture elements are white. Dispersed-dot methods depict a gray level by covering a small area with evenly distributed dots, while clustered-dot methods concentrate the dots in small groups.

The most popular halftoning method is the ordered dither technique. This technique uses a deterministic perturbation to generate periodic patterns, and according to the distribution of perturbations it can produce dispersed or clustered dots.

Other important methods are the error diffusion techniques, including the well known Floyd-Steinberg, and Knuth's dot-diffusion. These methods generate aperiodic patterns as the result of neighborhood operations. All published error diffusion methods fall into the dispersed-dot category.

The ordered dither technique determines a matrix of quantization thresholds that is replicated over the image. This is essentially a set of pseudo-random numbers uniformly distributed over the intensity range. The arrangement of thresholds is designed to avoid the introduction of low spatial frequency noise into the image. This algorithm is generally identified as a dispersed-dot technique, but if the intensity threshold levels are spatially concentrated it results in a clustered-dot dithering.

The Floyd-Steinberg method computes the quantization error incurred in one picture element and propagates it to the neighbors to the right and below. In this manner, the local quantization error is distributed, minimizing the intensity difference between the original and quantized images.

Knuth's dot-diffusion method combines some characteristics of ordered dither and error diffusion techniques. Similar to the ordered dither technique, the dot-diffusion method uses a matrix that is replicated over the entire image. This matrix gives the order by which the quantization error in one display cell will be distributed among it's neighbors in the cell.

As mentioned earlier, a large class of display devices cannot reproduce quality configurations of sparse ON and OFF pixels. For this reason, most page description languages employ clustered-dot ordered dithering, as the standard halftoning method. These and other methods in the related art have clear perceptual disadvantages because they produce regular patterns that result in an artificial image appearance.

In U.S. Pat. No. 5,226,096 to Fan, a general image quantization method is described. This method combines ordered dither with error diffusion on a dot to dot basis.

U.S. Pat. No. 5,041,920 to Hayes et al discloses a dithering process in which an addressing scheme based on halftone matrices is used to convert gray intensity input values to binary output values.

In U.S. Pat. No. 4,651,228 to Koch, U.S. Pat. No. 4,868,587 to Loce et al, U.S. Pat. No. 5,050,000 to Ng, U.S. Pat. No. 5,099,259 to Hirahara et al and U.S. Pat. No. 5,107,349 to Ng et al, four different multilevel halftoning methods are discussed. These methods employ a n-level hierarchical structure to improve the image quality resulting from the dithering process. Koch exploits a grid whose image spot is composed of sub-image spots which are offset relative to one another avoiding pattern artifacts. Loce et al exploits trinary and quanternary halftone matrices to obtain a correct tone reproduction system. Ng(000) exploits a cell-subcell structure to perform the diffusion of the quantization error and preserve image sharpness. Hirahara et al exploit pixel neighboring information to create a multilevel dot generator that produces diamond shaped patterns. Ng et al (349) exploits a matrix-supermatrix structure to maintain the halftone screen angle for a fixed number of threshold values.

U.S. Pat. No. 4,780,711 to Doumas and U.S. Pat. No. 5,130,821 to Ng both make use of the gradient of the image intensity to improve the quality of the dithered image. Doumas describes a method to control the dither patterns by matching sharp variations of image intensity with a predefined number of template patterns. Similarly, Ng describes a method which selects a threshold dither template based on the pixel density derivatives. U.S. Pat. No. 4,456,924 to Rosenfeld, U.S. Pat. No. 4,499,489 to Gall et al and U.S. Pat. No. 4,884,080 to Hirahara et al, are dithering methods to color halftoning. Hirahara et al disclose a color image reproduction apparatus in which the relative position of dots corresponding to each color component is determined by complementing halftone matrices.

In U.S. Pat. No. 4,843,468 to Drewery, an image scanning scheme for transmission of television images is described. It uses multiple approximations of a fractal curve to encode, transmit and decode images of variable spatial resolution. While this method employs a fractal curve, it is not a halftoning method since the intensity range of the image does not change from the input to output ends.

The halftoning methods of the inventions cited above are clustered-dot methods which combine, in one way or another, ordered dither with error diffusion. Therefore, a common feature of these methods is that they generate periodic patterns similarly to the dot diffusion algorithm.

In contrast, the present invention provides a clustered-dot digital halftoning method which does not use a dither matrix and which further generates aperiodic patterns.

SUMMARY OF THE INVENTION

Accordingly, it is an object of the present invention to overcome these perceptual disadvantages of artificial periodic patterns by providing an alternative solution to the halftoning problem that results in natural aperiodic patterns.

It is a further object of the present invention to provide a method that works very effectively in graphic displays as well as in hardcopy devices and could be used in printing processes, specially in high resolution and color printing.

It is yet a further object of the present invention a method that parameterizes the dot aggregation factor allowing a precise control of the cluster size, which can vary in one pixel steps.

This is the first method that effectively unifies the dispersed and clustered-dot techniques. When the cluster size is one pixel it reduces to a dispersed-dot dithering using error diffusion.

To this end, the invention is a digital halftoning method based on space filling curves, it uses the path of the curve to distribute the quantization error over the image.

These and other objects and advantages of the present invention will appear the following description taken together with the accompanying drawings.

BRIEF DESCRIPTION OF THE DRAWINGS

For a fuller understanding of the nature of the present invention, reference should be had to the following detailed description taken in connection with the accompanying drawings in which.

DETAILED DESCRIPTION OF THE PREFERRED EMBODIMENT

Mathematical and Systems Preliminaries Space Filling Curves

Let R denote the set of real numbers.

A continuous plane curve is a continuous map $c: I \rightarrow R^2$ from the unit interval $I=[0,1]$ of the real line to the two-dimensional Euclidean plane $R^2=\{(x,y); x,y \in R\}$. The image $c(I)$ is called the trace of the curve c. A space filling curve is a continuous curve such that its trace covers the unit square $I^2=[0,1]\times[0,1]$ of the plane. Therefore, for each point P in the square $I^2$ there exists a real number t in the interval I such that $c(t)=P$. Intuitively, this means that the curve provides an ordered way to visit all points of the square as the parameter t moves from 0 to 1.

Space filling curves were first discovered by the italian mathematician Giuseppe Peano in 1890, and they constitute the first examples of the mathematical objects that Benoit Mandelbrot called fractal sets [Mandelbrot 77].

The mathematical construction of a space filling curve c is done as a limiting process. We consider a sequence $c_n: I \rightarrow I^2$ of curves in the unit square, and we define c as the limit $$c = \lim_{n \rightarrow \infty} c_n$$

when this limit exists. The curves $c_n$ constitute approximations of c, and as we increase n it visits a greater number of points in the unit square. It is possible to construct space filling curves for which each curve $c_n$ is simple, i.e. the map is 1-1. This means that it does not visit a point in the square more than once. In general it is possible to construct the sequence $c_1, c_2, \ldots, c_n, \ldots$ of approximating curves in a recursive way. In a certain sense a space filling curve defines a relationship between the area of subregions of the unit square $I^2$ and the length of subintervals of the unit interval I.

Space filling curves can be properly specified by a formal geometric language. Sentences in this language are defined by a parallel graph grammar, and they are constructed by recursively applying a set of rewriting rules. Each sentence corresponds to a curve $c_n$ from the approximating sequence of the space filling curve. We will refer sometimes to this approximation itself as a space filling curve. A discussion about computational methods to generate space filling curves can be found in [Prusinkiewics 90].

Figure 1A:
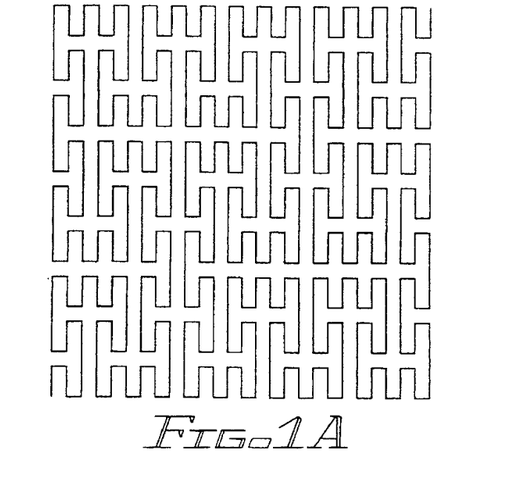
FIG. 1 shows examples of the classic space filling curves.
Figure 1B:
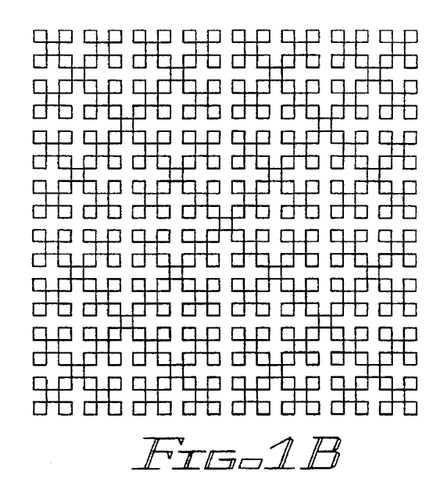
Figure 1C:
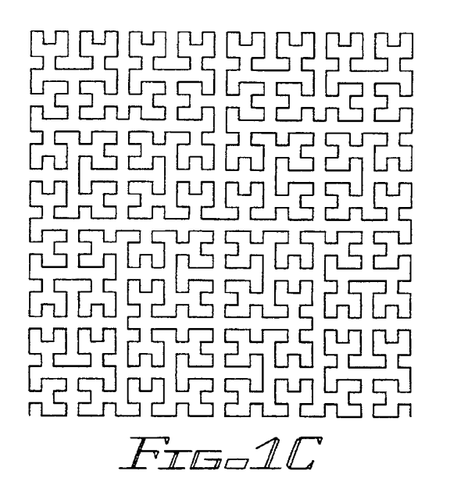

The classic space filling curves are the Peano curve, the Hilbert curve, and the Sierpinsky curve. FIG. 1(a)(b)(c) shows an approximation of these curves. All curves in the approximating sequence of these curves are simple.

Digital Image

A digital image is a matrix A of MxN elements $a_{ij}, i=1,M$ and $j=1,N$, called pixels.

Each element is associated with a value representing either a gray scale intensity or a color. In a gray scale, pixel values are scalar quantities. In a color image, pixel values are vector quantities.

The image intensity at position (i,j) is the value of the pixel (a_ij). The average image intensity over a region is the sum of pixel values in this region, divided by the number of pixels.

The intensity resolution in a digital image is the number of bits used to represent intensity values. When the intensity resolution is K, there are $2^k$ intensity values, each of these values is called a quantization level.

Image Scan

The image scan is a scheme to visit all pixels of the image in a sequential order. Therefore, the scan process can be defined by a simple curve whose trace contains all pixels in an image. A space filling curve may be used to scan an image. In this case, each curve $c_{13}$ n of the approximation sequence visits a subset of points of the image. If we consider the square grid defined by the pixels of a raster image it is possible to address uniquely all pixels using a simple approximating curve $c_n$ of a space filling curve. Therefore, these curves constitute an effective method to scan a raster image.

The scan method described above has several advantages over the traditional scanline method for some class of image operations. The recursive nature of the construction of space filling curves allow a subdivision of the image into regions where each region is mapped to some subinterval of the unit I. This implies in a certain sense a reduction of the dimensionality of the problem, and simplifies immensely algorithms that deal with small regions of the image, as well as the computations involved.

The path followed by the space filling curve results in an image scan free of directional features presented by the traditional scan-line raster pattern.

Imaging Systems

The imaging system performs several preprocessing operations in order to generate the proper representation of a continuous-tone picture on a specific graphic display device. This process must take into account the particular characteristics of the device to produce the best possible rendition of the picture.

The device's characteristics can be modeled as a mathematical function, defined on the space of images, called physical reconstruction function. The preprocessing operations generally include: tone scale adjustments, sharpening and halftoning.

The tone scale adjustment is necessary because most devices have a non-linear intensity reconstruction function. This operation compensates, for example, the overlapping of contiguous dots, typical of some hardcopy devices. Detailed explanations on how to construct compensation tables for CRT monitors can be found in the literature (see for example [Catmull 79]). This procedure can be generalized for other types of graphic devices.

The sharpening is desirable because the dithering normally causes some reduction of the image spatial resolution. The quality of the final image can be greatly improved by an edge enhancement operation that emphasizes high frequencies, bringing out the fine image details. Alternatively, the sharpening operation can be incorporated into the halftoning process, as was observed by Jarvis [Jarvis et al 76].

Halftoning

The existence of only two levels to display continuous-tone images introduces visual artifacts, often manifested as false contours separating regions of different levels. Dithering alleviates this problem by properly controlling the distribution of bilevel intensities over the displayed image. The type of pixel configuration produced is determined by the spatial distribution of the ON or OFF state of the picture elements (black or white). The area covered by a cluster of ON pixels is called dot area, and the arrangements created by the dot distribution is called dot pattern.

The dithering process is based on psychophysical characteristics of the human visual system. The eye integrates luminous stimuli over a small solid angle [Wyszecki et al 82]. This means that we actually see the average intensities corresponding to small solid angles in our visual field. Dithering methods explore this phenomenon, effectively redistributing the state of pixels in such a way that the average intensity in small areas of the dithered image is approximately the same of the original gray scale image.

Given a pixel P of the image with intensity I(P), it will be mapped into a pixel P' of the dithered image whose intensity I(P') is 0 or 1 (black or white). The value of I(P') is obtained by comparing the intensity I(P) with a given intensity threshold $I_0$. The difference I(P)-I(P') is the quantization error for the pixel P. In general, given a region of the image with N pixels, P1,P2, . . . ,$P_N$, N+1 intensity levels can be represented by turning these pixels "on" and "off". The quantization error for this region is the difference $$\sum_{j=1}^{N} I(Pj) - \sum_{j=1}^{N} I(Pj'),$$

between the sum of intensities of the gray scale image in the region and the sum of the intensities of the corresponding region in the dithered image.

Description of the Invention

The digital halftoning method object of the present invention exploits the properties of space filling curves to perform neighborhood operations essential to spatial dithering. This section presents the general context in which the invention is applied, overall structure of the proposed method and describes in detail its main aspects.

Main Steps of the Method

Figure 2:
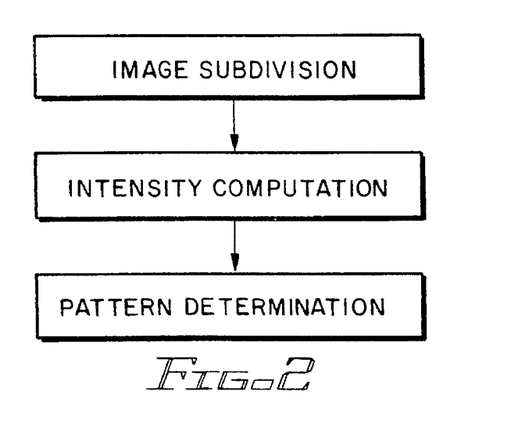
FIG. 2 is a diagram of the main operations of the method of the present invention.

The method consists of the following main steps (FIG. 2):

Subdivision of the source image into small regions based on the trace of the space filling curve;

Computation of the average intensities of each region;

Determination of the dot patterns of the dithered image corresponding to each intensity;

Image Subdivision

The method takes advantage of some properties of space filling curves that allows a subdivision of a raster image into regions with desirable characteristics. Let $c_n:I->I^2$ be an approximation of a space filling curve c that visit uniquely all pixels of the image. Let $I_1,I_2, \ldots ,I_n$ be a subdivision of the unit interval I into n subintervals. By restricting the curve $c_n$ to each subinterval $I_j$ we obtain n subregions $R_1,R_2, \ldots ,R_n$ of the image. The size of each subregion $R_j$ varies proportionally with the length of the corresponding subinterval $I_j$. This gives an ordered way to visit all subregions $R_1, \ldots R_n$ and also to visit all points in each of these subregions. Besides this, the restriction $c_j:I_j->R_j$ is by itself a space filling curve, that is a scaled version of the original curve c, because of the self-similarity properties of the space filling curves. This characterization minimizes the grid effect often manifested in dithering methods that use standard methods of image scan.

Dot Generation

The dot generation strategy is a direct consequence of scanning the image with a space filling curve. The object is to produce, for a given region, a configuration of clustered dots that will result in a perception equivalent to the intensity of the original image. This depends on the area of the region, the average intensity over the region, and the graphic device's physical reconstruction function.

As described above, the trace of the space filling curve determines a relationship between the area of the region and the length of the curve. Suppose that the average intensity of a region R is I. Ideally, the desirable perceptual results would be obtained by partitioning $R=R_1 \cup R_2$ into two subregions $R_1$ of white pixels, and $R_2$ of black pixels, such that $R_1$ corresponds to a subinterval of length proportional to I and $R_2$ corresponds to a subinterval of length proportional to 1-I. In practice, this subdivision cannot be done exactly because there is a discretization process involved that is influenced by the physical characteristics of the output device.

The dot configuration produced by the space filling curve method results in an aggregate of pixels connected not only sequentially by the curve, but also in other directions because of the intertwined way the space filling curve traces the region. Consequently, the cluster of dots obtained is confined within the limits of a circle that has an area close to the areas of the region. As a whole, the patterns generated by this type of dots are evenly distributed but not periodic.

In order to account for the fine details of the image, it is desirable that the dot configuration grows outwards from the point of highest intensity of the region. This can be accomplished by centering the white subregion with a proper translation of the corresponding subinterval.

Figure 3:
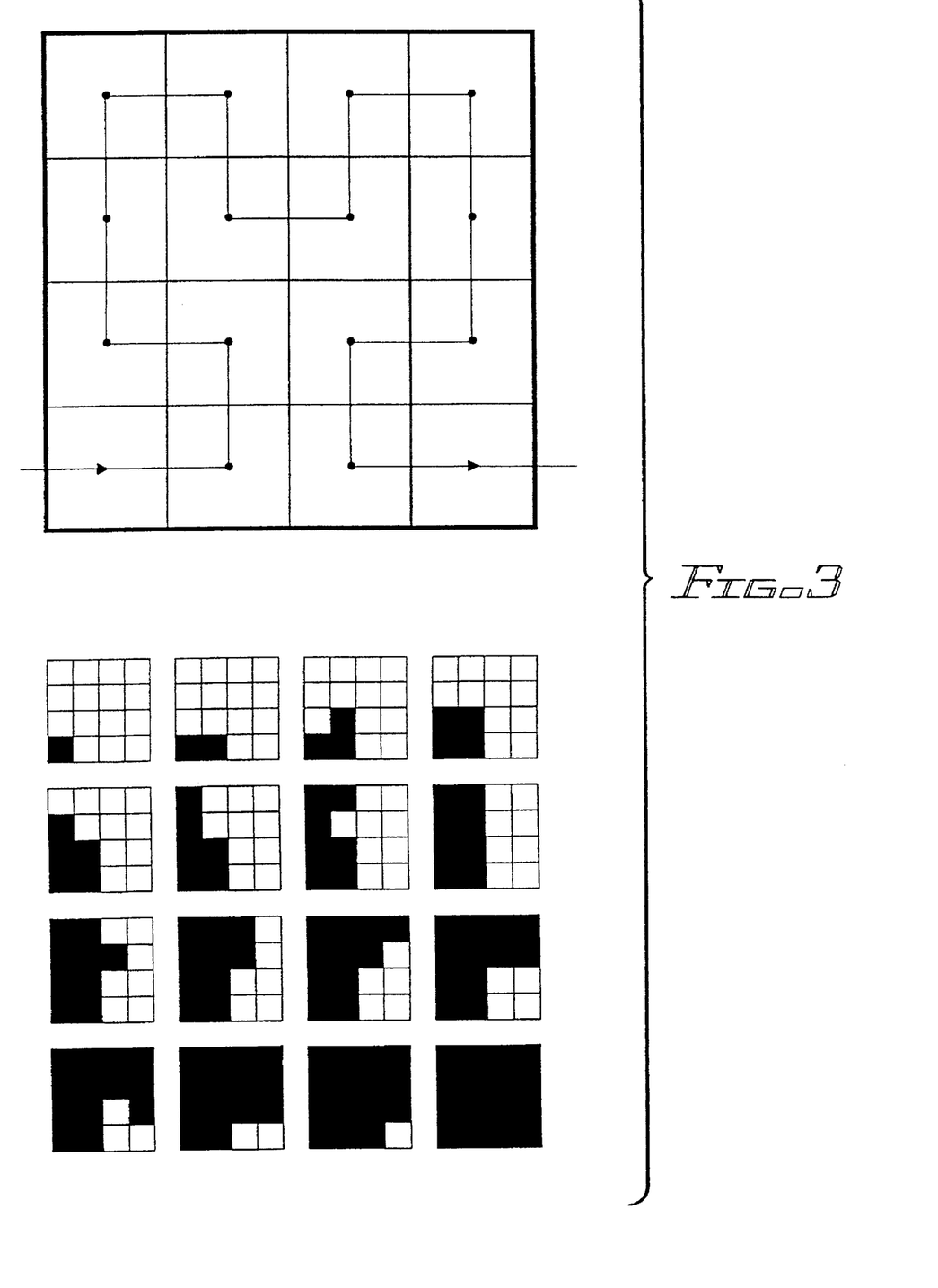
FIG. 3 illustrates the pixel clustering induced by the Hilbert space filling curve.
Figure 4:
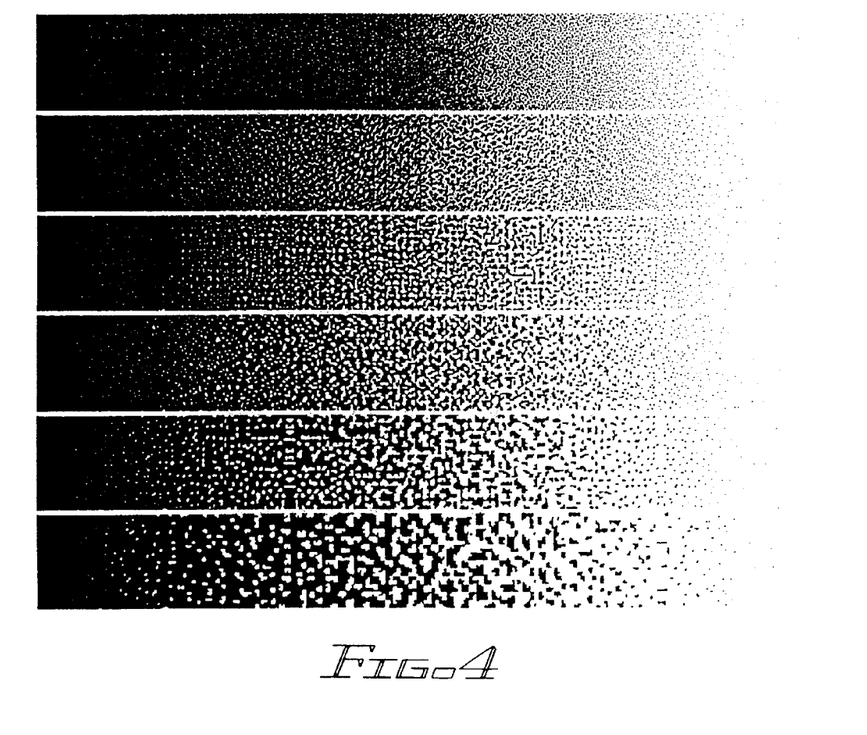
FIG. 4 is a rendition of a gray scale ramp using the method of the present invention with clusters of variable size.

FIG. 3 illustrates clusters of dots corresponding to intensities $1\frac{1}{16}$ to 0 for the Hilbert curve, in a region of 4×4 pixels. In FIG. 4 we used the method to render a black to white gradation using different sizes for the dot aggregation.

Error Diffusion

Figure 11:
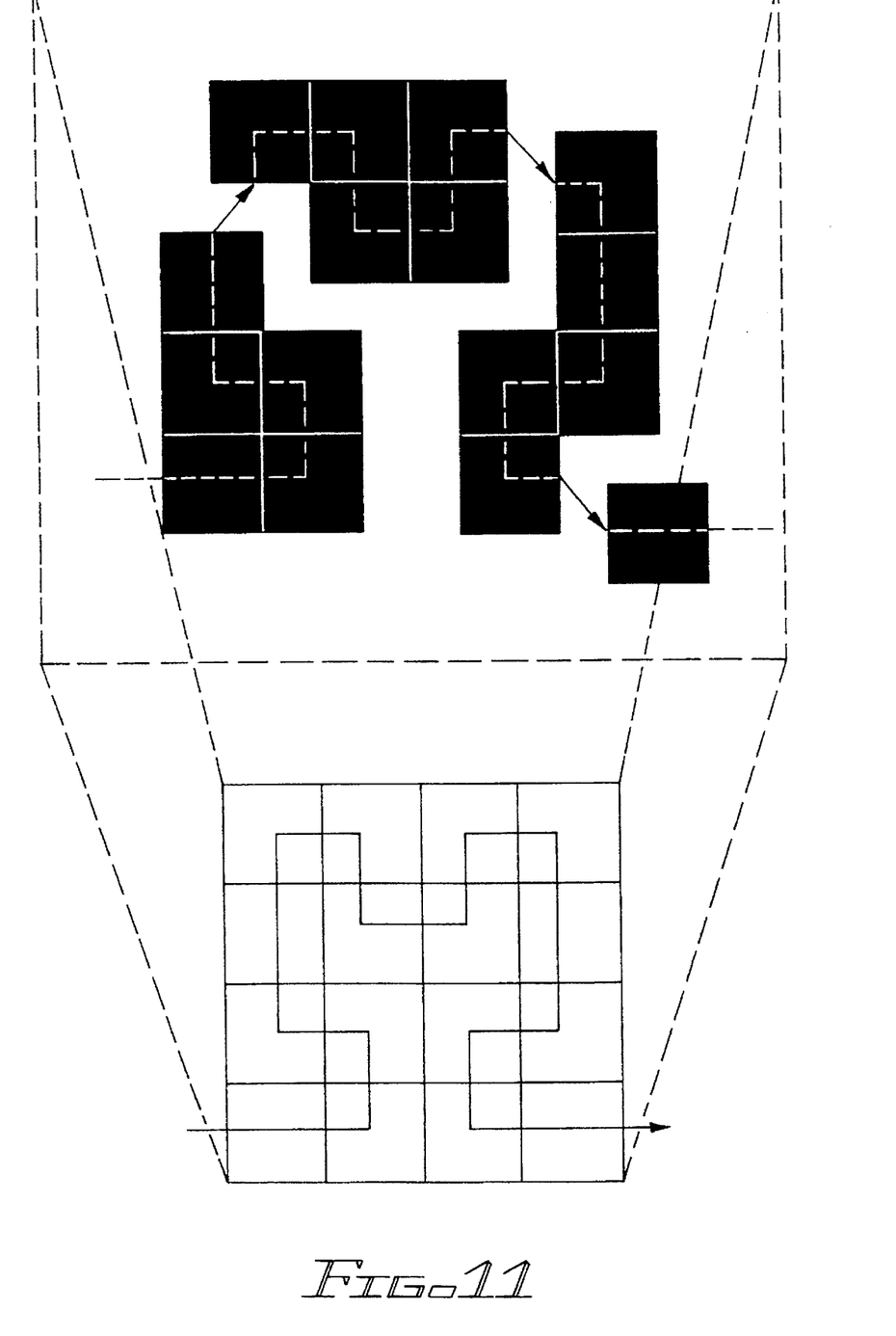
FIG. 11 is a schematic diagram illustrating the error diffusion scheme using the space filling curve in accordance with the method of the present invention.

The discrete nature of the reproduction process, as we have seen, may result in quantization errors. This error can be propagated along the path of the space filling curve in order to minimize the total quantization error. This is similar to the dispersed-dot error diffusion dithering techniques, but works on display cells of more than one pixel. FIG. 11 shows the error diffusion scheme using space filling curves.

Analysis

The space filling curve dithering method generates aperiodic patterns of evenly distributed dots without direction artifacts. These features are evident in the examples shown in FIG. 5 and 6. The images were produced using the proposed method and printed on a 300 dpi laser printer.

Figure 5:
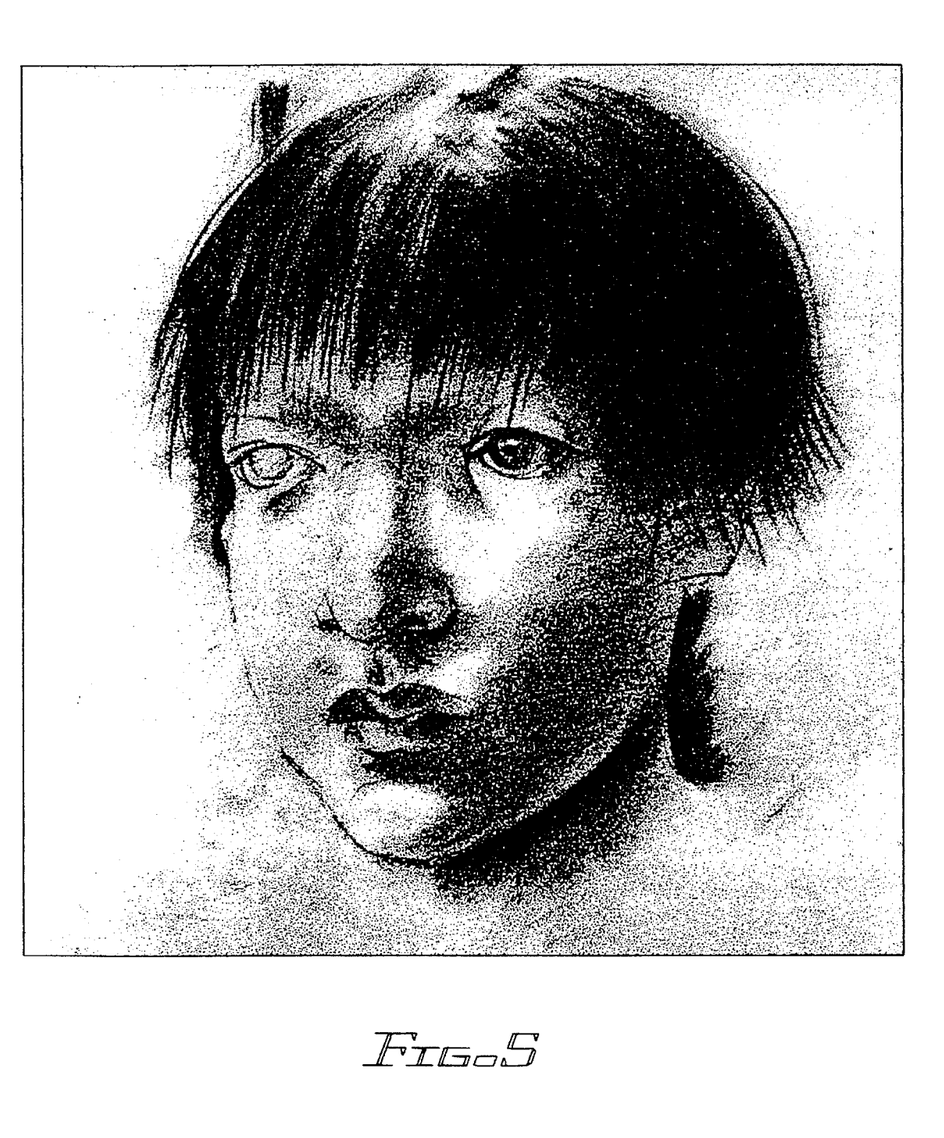
FIG. 5 and 6 are respectively a drawing and a synthetic image rendered using the method of the present invention. These images were chosen as representatives of the common types of images in printing applications.
Figure 6:
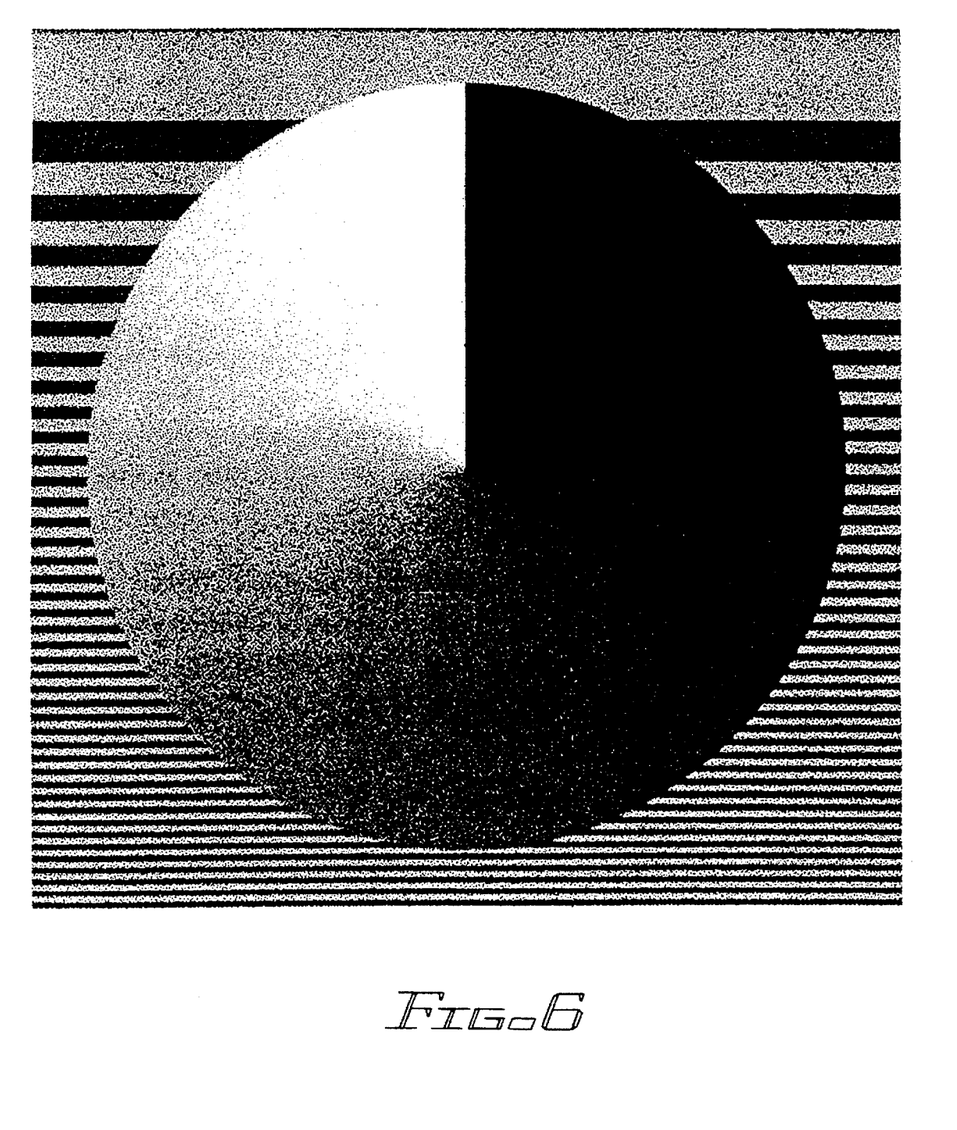

In the preprocessing step, only tone scale adjustment was performed prior to the halftoning operation. Edge enhancement was not necessary because the method handles very well fine details.

In both images the Hilbert's space filling curve was used. The clustering size was of 11 pixels. Before dithering the images were scaled down to 150 dpi.

Figure 7:
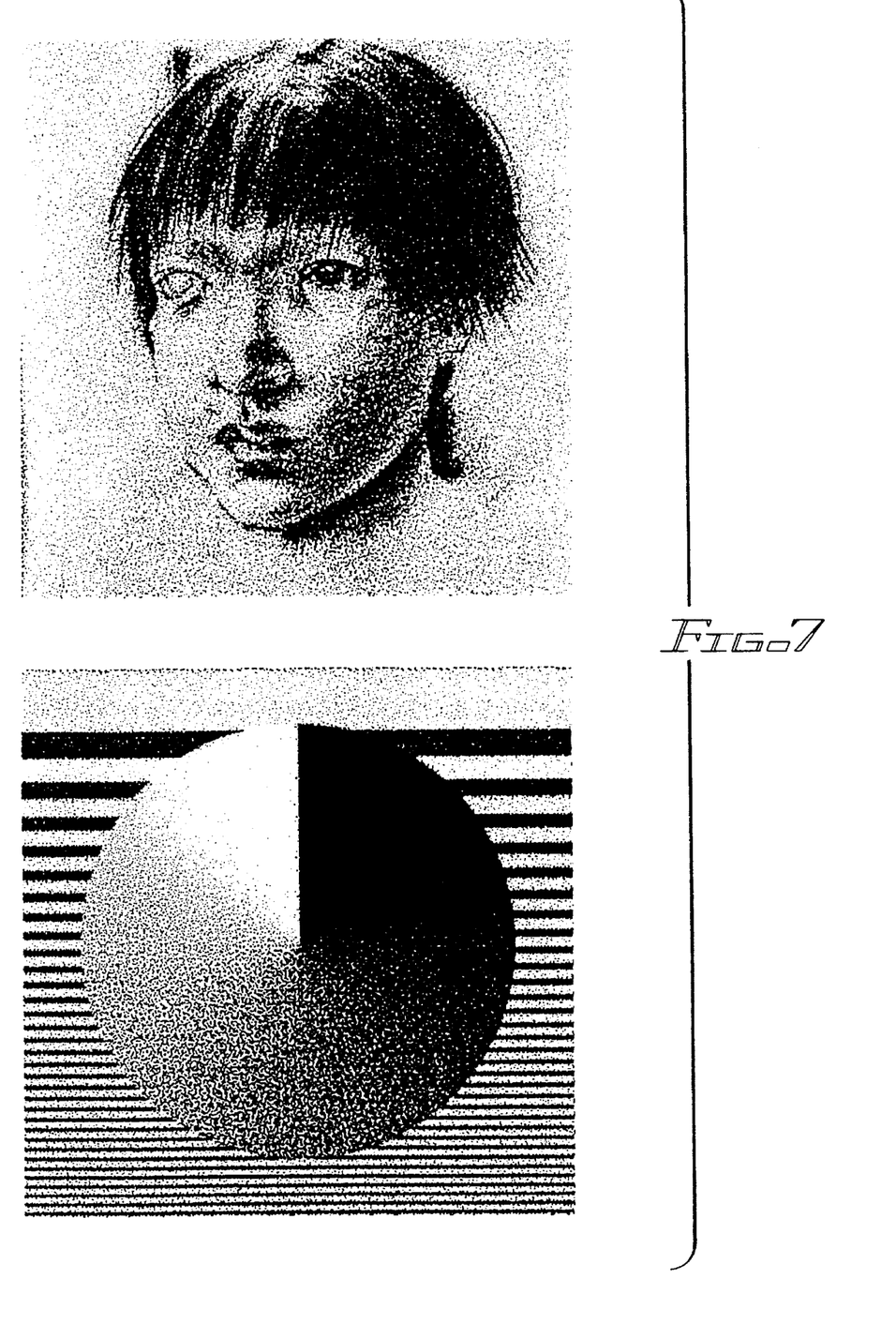
FIG. 7, 8 and 9 compare low resolution versions of images 5 and 6 rendered with differed dithering methods.
Figure 8:
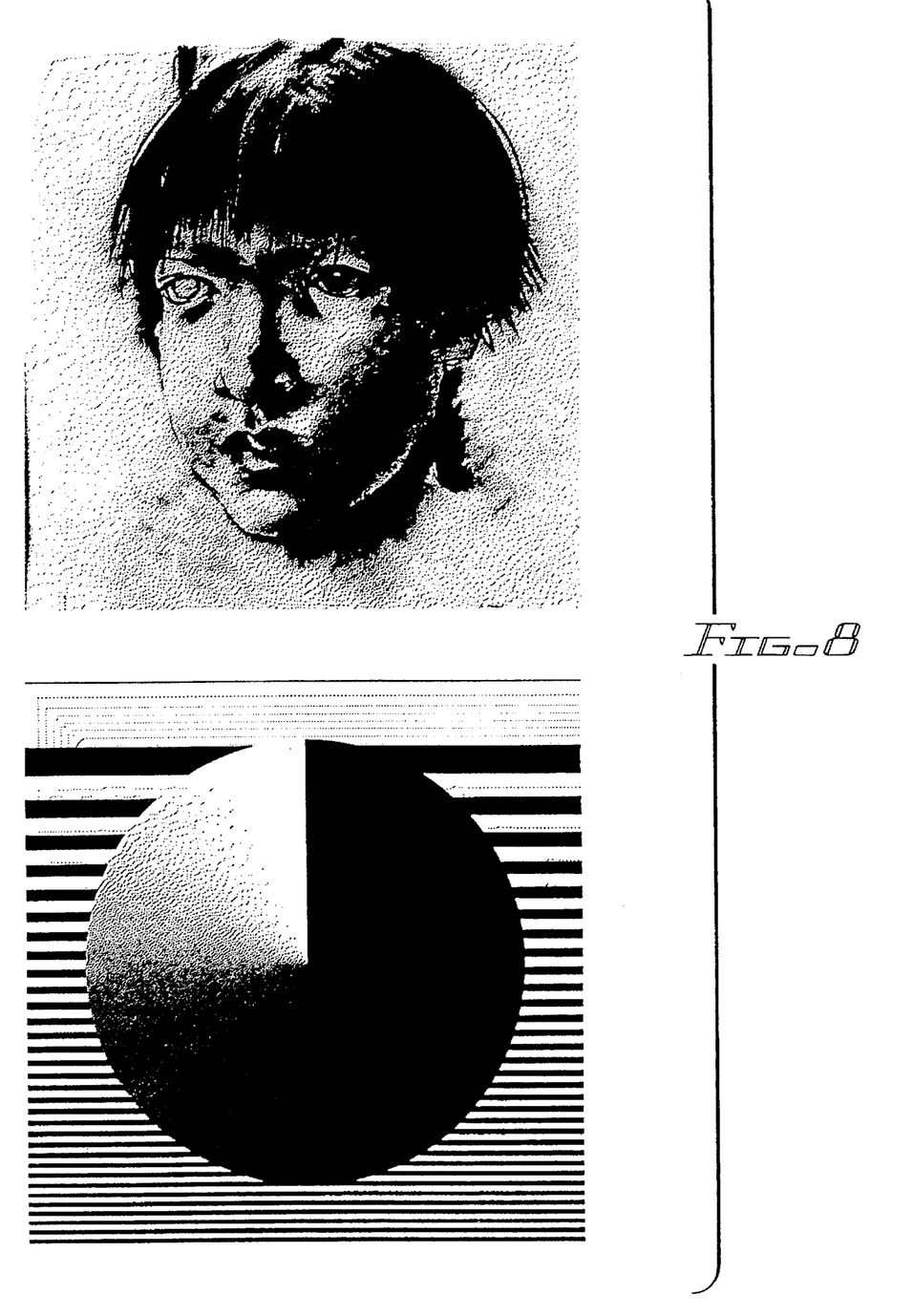
Figure 9:
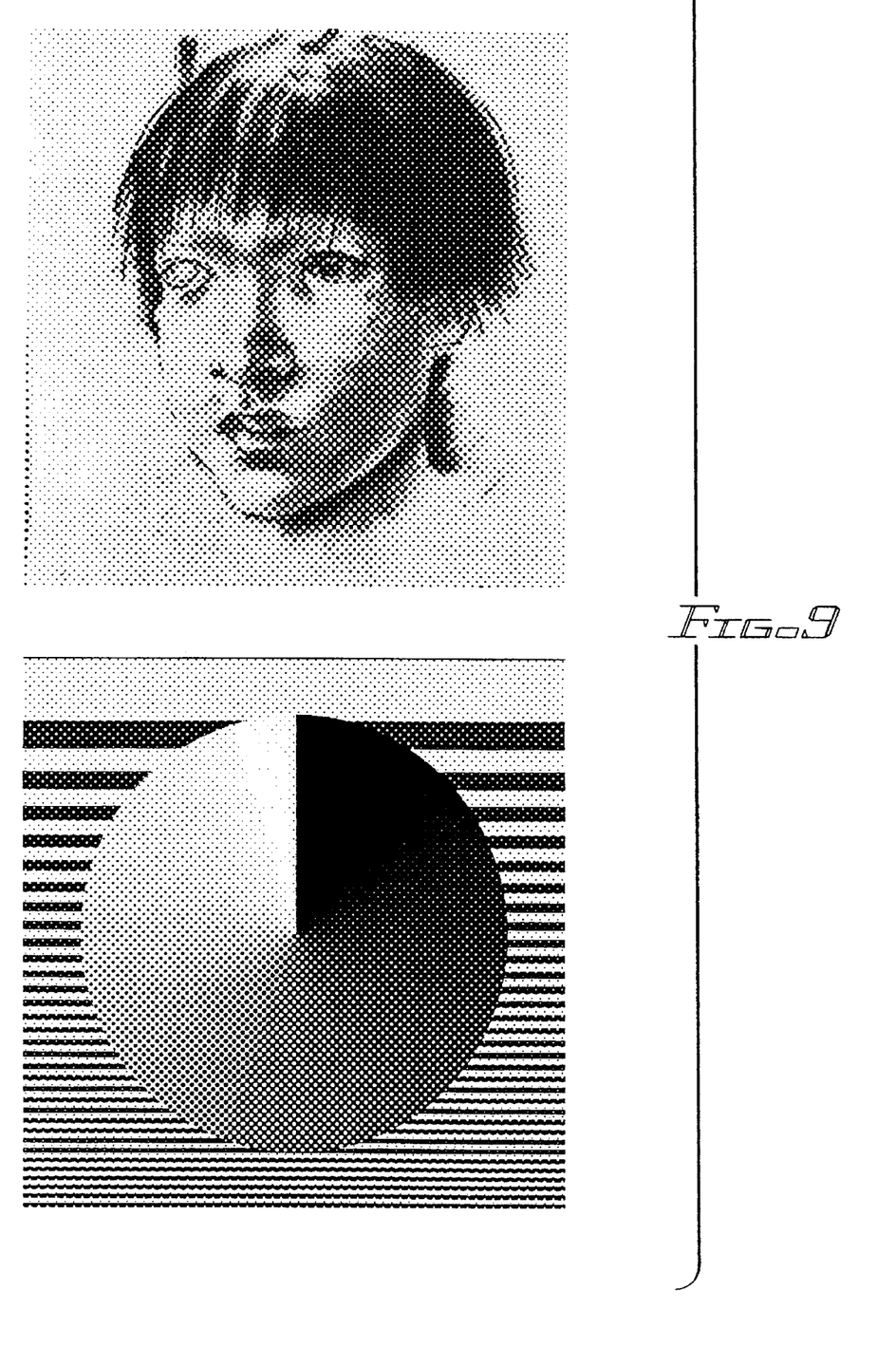

FIGS. 7, 8 and 9 are halftoned versions of the two images at a lower resolution, processed respectively by the space filling curve, the Floyd-Steinberg and the clustered-dot ordered dither method. They were included to compare the results of the new method with both a standard error-diffusion technique and with the clustered-dot method used in most hardcopy devices. For the last comparison we used a 8×8 matrix in the clustered-dot ordered dither and a cluster size of 32 pixels in the space filling curve dither. These choices produce clusters of approximately the same size. Before dithering the two images were scaled down to 75 dpi.

The Floyd-Steinberg method, as was expected, did not produce satisfactory results on the laser printer. This is because the dispersed-dot method is not appropriate for this device. Groups of nearby individual small dots tend to be merged into a large blob, For this reason, the gray levels are not reproduced well, increasing the image contrast.

The clustered-dot ordered dither method simulates the traditional analog halftoning screen. It reproduces very well the gray levels, but it blurs slightly the image. Depending on the cluster size contouring is more or less noticeable.

The space filling curve method renders well the gray levels, and at the same time captures the fine details. This is evident in particular in the face, eye and hair of the indian boy.

Description of a Typical Embodiment

The method object of the present invention can be implemented within the context of any electronic printing system. The system is required to have the following resources: an image buffer, an image processor and a program memory.

Algorithm

The pseudo-code below gives a description of the basic algorithm. R is the maximum pixel intensity (255 for images with 8 bits of intensity resolution), and N is the cluster size in pixels.

```
Select image scan size;
Initialize intensity accumulator;
While (pixels to be processed) {
        Advance image pointer along the scan
        path to the end of interval;
        Move backward N pixels, accumulating
        the intensity of the input image;
        Move forward N pixels along the path,
        setting the output pixels, doing the test:
        if (accumulator >=R) then {
                decrement R from accumulator;
                set output pixel "on";
        } else {
        set output pixel "off";
        }
}
```

Note that the algorithm implicitly accounts for the quantization error, propagating it along the path.

The processing structure of the algorithm allows the same image buffer to be used for both the input and the output image.

Image Scan Functions

The image scan pattern can be implemented by a library of functions with a common interface. This simplifies the addition of new types of space filling curves to the dithering operation. The library's front-end consists of two functions. The first one selects the curve to be used for the image scan and, if necessary, executes initialization and setup procedures. The second function moves forward and backwards along the path incrementally returning the coordinates of image to be visited. It should be called once for each element processed.

If efficiency is important, the library can be substituted by the scan function corresponding to a particular space filling curve.

One drawback of this embodiment of the invention described above is its high memory requirement. The entire image is buffered because of its non standard access pattern. This is not a serious restriction, except for very high resolution images. In this case, the problem can be addressed in two ways: the image can be subdivided in small blocks, and the algorithm is performed more or less independently in each one. This requires buffering of small strips of the image. Another solution is to store the image in a non standard way such that its structure favors the access pattern. This is discussed by Blinn in the context of texture mapping [Blinn 90].

Summary, Ramification and Scope

The space filling curve method object of the present invention has several advantages over previous ones. It generates patterns without the regular structure of the clustered-dot ordered dither. The patterns created are perceptually pleasant with similar characteristics to the photographic grain structure. The clustering factor can be easily parameterized, allowing the image rendition to match precisely the limits of the physical reconstruction function of the display device. The method can be applied to gray scale as well as to color images. It can also be used for exact reproduction or for creating illustration effects.

To extend the method of the present invention to process full color images, the method is applied independently to each color component.

Figure 10:
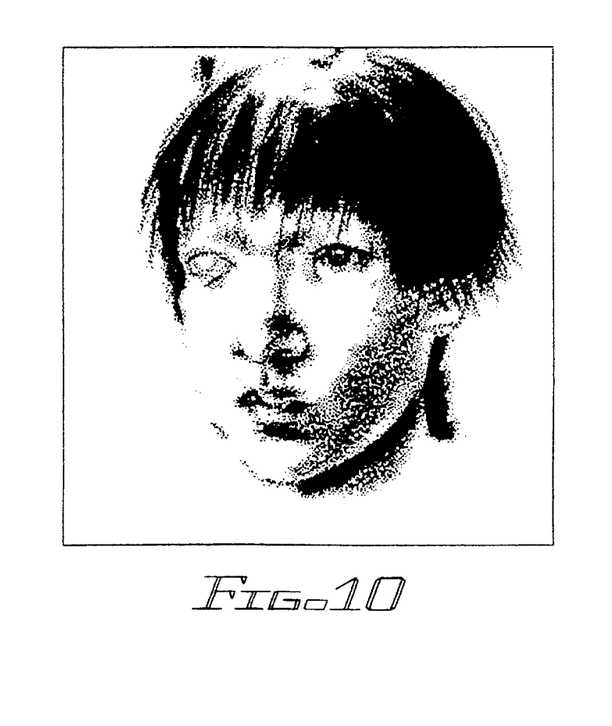
FIG. 10 is an example of a graphic special effect obtained with the method of the present invention.

The method of the present invention can also be used for illustration purposes. Several kinds of rendering effects can be obtained by a combination with image processing techniques. An example of this process, simulating pen-and-ink drawing, is shown in FIG. 10.

While the invention discloses and describes a preferred embodiment of the method, it is understood the invention is not so restricted.

We claim:

1. A digital halftoning method for creating a gray-scale monochrome reproduction of a source image in electronic display and printing systems, said method comprising the steps of:

subdividing the source image into regions based on a trace of a space filling curve, further subdividing each of said regions into equally sized pixels, the region defining a pixel cluster, each of said regions including at least one pixel, scanning said source image along the trace of said space filling curve to visit all pixels of said source image in a sequential order, calculating an average image intensity for each region of said source image, establishing a range of pixel cluster intensity levels based on a number of said pixels in said cluster, a particular intensity level of said pixel cluster being defined by the ratio of the number of pixels in said cluster being in an ON state and the total number of pixels in said cluster, the spatial configuration of said ON state pixels producing a dot pattern having an intensity level corresponding to the average image intensity for that region, and generating said dot pattern for each of said pixel clusters by activating individual ones of said pixels to said ON state in an order corresponding with said sequential order along the trace of said space filling curve through each of said pixels of said region with the option of distributing said ON pixels around a point of highest intensity of the source image in the region.

2. A digital halftoning method as recited in claim 1 wherein said subdivision of the source image into regions and said further subdivision of each of said regions into pixels is determined by the trace of said space filling curve over the source image.

3. A digital halftoning method as recited in claim 1 wherein each of said pixel clusters are comprised of a block of contiguous image elements along the trace of said space filling curve, said pixel clusters-having a fixed size for a given source image with the pixel cluster size starting from one pixel in said region and increasing by increments of one pixel.

4. A digital halftoning method as claimed in claim 1 wherein the size of said pixel clusters varies in accordance with a given source image so as to adapt to particular properties of the source image, including but not limited to a directional derivative of an intensity value along said space filling curve and relative contrast of color component values.

5. A digital halftoning method as recited in claim 1 wherein the size of said pixel clusters is derived from characteristics of the display system, including but not limited to display resolution, tone reproduction and color space.

6. A digital halftoning method as recited in claim 1 wherein said step of calculating an average gray-scale intensity for each region further includes the steps of:

accumulating intensity values of all pixels in said pixel cluster, calculating a quantized value and corresponding quantization error for said region, and distributing the quantization error among subsequent pixel clusters along the trace of the space filling curve.

* * * * *